United States Patent [19]

Link

[11] Patent Number: 5,456,645
[45] Date of Patent: Oct. 10, 1995

[54] ROLL

[75] Inventor: Christoph Link, Weingarten, Germany

[73] Assignee: Sulzer Escher-Wyss GmbH, Ravensburg, Germany

[21] Appl. No.: 85,238

[22] Filed: Jun. 30, 1993

[30] Foreign Application Priority Data

Jul. 18, 1992 [DE] Germany ............ 42 23 715.7

[51] Int. Cl.[6] .................................. B23P 15/00
[52] U.S. Cl. .................................. 492/16; 492/7
[58] Field of Search .............. 492/7, 16, 6, 17, 492/18, 19, 20

[56] References Cited

U.S. PATENT DOCUMENTS

| | | | |
|---|---|---|---|
| 4,841,610 | 6/1989 | Quehen | 492/7 |
| 4,864,703 | 9/1989 | Biondetti | 492/16 |
| 4,916,748 | 4/1990 | Schrors | 492/16 |
| 5,033,176 | 7/1991 | Schiel | 492/7 |
| 5,060,357 | 10/1991 | Roerig et al. | 492/7 |
| 5,104,489 | 4/1992 | Beisswanger et al. | 492/16 |
| 5,206,978 | 5/1993 | Pav | 492/7 |
| 5,286,245 | 2/1994 | Schiel | 492/7 |

FOREIGN PATENT DOCUMENTS

| | | |
|---|---|---|
| 0248738 | 12/1987 | European Pat. Off. . |
| 0309530 | 4/1989 | European Pat. Off. . |
| 0340192A2 | 11/1989 | European Pat. Off. . |
| 0340193A2 | 11/1989 | European Pat. Off. . |
| 2297683 | 8/1976 | France . |
| 2503051 | 7/1976 | Germany . |
| 3011669C2 | 10/1981 | Germany . |
| 3022491C2 | 12/1981 | Germany . |
| 3525950 | 12/1986 | Germany . |
| 3820974 | 4/1990 | Germany . |
| 3925019A1 | 2/1991 | Germany . |
| 541088 | 8/1973 | Switzerland . |
| 2011555 | 7/1979 | United Kingdom . |
| 2136091 | 9/1984 | United Kingdom . |
| 2178510 | 2/1987 | United Kingdom . |

OTHER PUBLICATIONS

"Die energiesparende Schwimmednde Walze Küsters", in: Das Papier, 1986, vol. 10, pp. 512–513.

Primary Examiner—Irene Cuda
Attorney, Agent, or Firm—Townsend and Townsend and Crew

[57] ABSTRACT

A roll includes a roll jacket (1) which is rotatably journalled on a stationary carrier (2), with an at least approximately stationary active element (3) being arranged between the roll jacket (1) and the carrier (2), and with the space (4) between the carrier (2) and the roll jacket (1) being at least partially filled with a liquid. Such rolls are in particular used in the manufacture or treatment of material webs. In order to reduce the undesired turbulence losses passages are provided which extend through the active elements (3) approximately in the circumferential direction of the roll.

9 Claims, 3 Drawing Sheets

US 5,456,645

ROLL

The invention relates to a roll comprising a roll jacket which is rotatably journalled on a stationary carrier with at least one approximately stationary active element being arranged between the roll jacket and the carrier, and with the space between the carrier and the roll jacket being at least partially filled with a liquid. Such rolls are used in the manufacture or treatment of material webs.

BACKGROUND OF THE INVENTION

By way of example, a roll having support elements is known. Such a roll has a roll jacket which is built up of layers which have different physical characteristics. Because of the hydrostatic lubrication of the support elements, the space between the carrier and the roll jacket is at least partially filled with a fluid lubricant. As result, at high web speeds over the roll the eddying or turbulence of the lubricant through non-rotating support elements consumes a considerable proportion of the drive power which leads to heating of the lubricant. This has a particularly negative effect with rolls which should have a relatively cold surface or with rolls in which the material of the roll jacket or of the roll jacket layer does not withstand heating.

These circumstances gain in significance when, due to the use of flexible roll jackets or of high pressing pressures, having high contact pressures on the surfaces of the roll, the spacings between the support elements has to be reduced. Additional turbulence or swirling of the lubricant takes place. This can be counteracted by cooling the lubricant outside of the roll, which is naturally disadvantageous from an energetic viewpoint.

SUMMARY OF THE INVENTION

In a roll including a roll jacket (1) rotatably journalled on a stationary carrier (2) for rotation in a circumferential direction (U) with a space between the roll jacket and the stationary carrier, an improved support for the roll jacket is disclosed. At least one stationary active element (3) is arranged between the roll jacket (1) and the stationary carrier (2) having an axial width relative to an axis extending in an axial direction of said roll jacket. A radially outwardly disposed active element head (6) contacting the roll jacket at a radially outwardly directed surface (9) on the stationary active element (3) supports the roll jacket. The space (4) between the stationary carrier (2) and the roll jacket (1) is at least partially filled with a lubricant liquid which is entrained by rotation of the roll jacket. The improvement to the stationary active element includes at least one passage (5) having respective passage openings and having a cross section sufficient for fluid flow extending in the circumferential direction (U) of the roll jacket passing through the radially outwardly disposed active element head (6). This one passage substantially enlarges the total cross section of the flow paths for the liquid to produce a low flow resistance for liquid entrained by the roll jacket.

The invention is thus based on the object of reducing the undesired turbulence losses in rolls.

Due to the fact that each active element has as far as possible at least one passage which extends in the circumferential direction of the roll both the number and also the total cross section of the flow paths are increased. The number of total cross-section increase is associated with a reduction of the turbulence. It is entirely possible for parts of the passage boundary to be removed. If the passages lie at an angle to the circumferential direction of the roll and/or extend in curved manner to one end of the roll, then the possibility additionally exists of directing the liquid to the discharge devices which are mainly arranged at the side.

The passages should be located in the vicinity of the roll jacket. This is especially the case if only a part of the intermediate space is filled with liquid. Moreover, the flow speed is greatest in the vicinity of the roll jacket. The flow resistance, and thus also the turbulence, can be reduced when at least a part of the passage boundary directed towards the roll jacket is extended beyond the respective passage opening. This extension beyond the passage opening is preferably a flexible extension part secured to the active element. This flexible extension part can extend up to contacting guidance at the inner side of the roll jacket or can extend up to a minimal spacing from the inner side of the roll jacket.

BRIEF DESCRIPTION OF THE DRAWINGS

The invention will be explained in more detail in the following with respect to four embodiments, with the terms "axial" and "radial" always being related to the roll. In the accompanying drawing there are shown.

DESCRIPTION OF THE PREFERRED EMBODIMENTS

Figure 1:
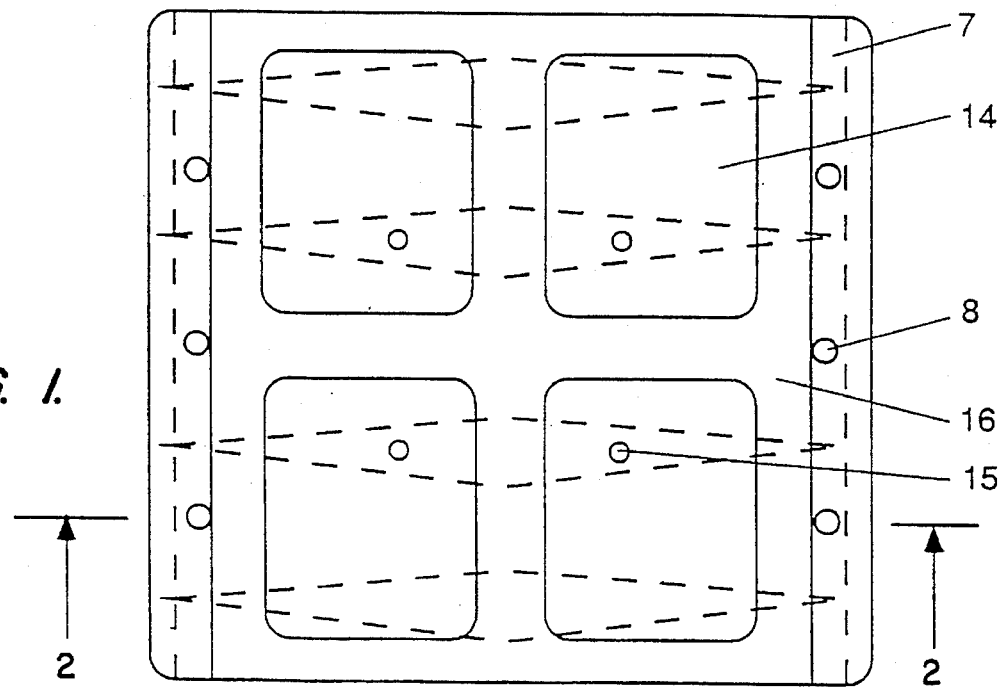
FIG. 1 is a plan view onto the radially outwardly directed surface 9 of an active element 3 of the first embodiment.

All embodiments have the common feature that the roll jacket 1 is rotatably arranged on a fixed carrier 2 and is journalled or supported thereon by means of a plurality of active elements 3 in the form of hydrostatic support elements.

Liquid lubricant arises and collects in the space 4 between the roll jacket 1 and the carrier 2 and is generally led away via openings in the carrier 2.

In order to reduce turbulence losses of the liquid caused by the active elements 3 a plurality of passages 5 pass through each active element 3 and extend approximately in the circumferential direction U of the roll. These passages are located in the head of the active element 6 in the vicinity near the roll jacket 1.

The active elements 3 are each slidingly guided via their feet 10 in a respective recess 11 of the carrier 2. A pressure space 12 is present in the recess 11 between the carrier 2 and the foot 10 of the respective active element. A line 13 for liquid under pressure opens into each pressure space (line 13 is only shown in FIG. 5). The radially outwardly directed surface 9 of the active element head 6 has a plurality of hydrostatic bearing pockets 14 which are respectively connected with the pressure space 12 via a bore 15 in each case.

Figure 2:
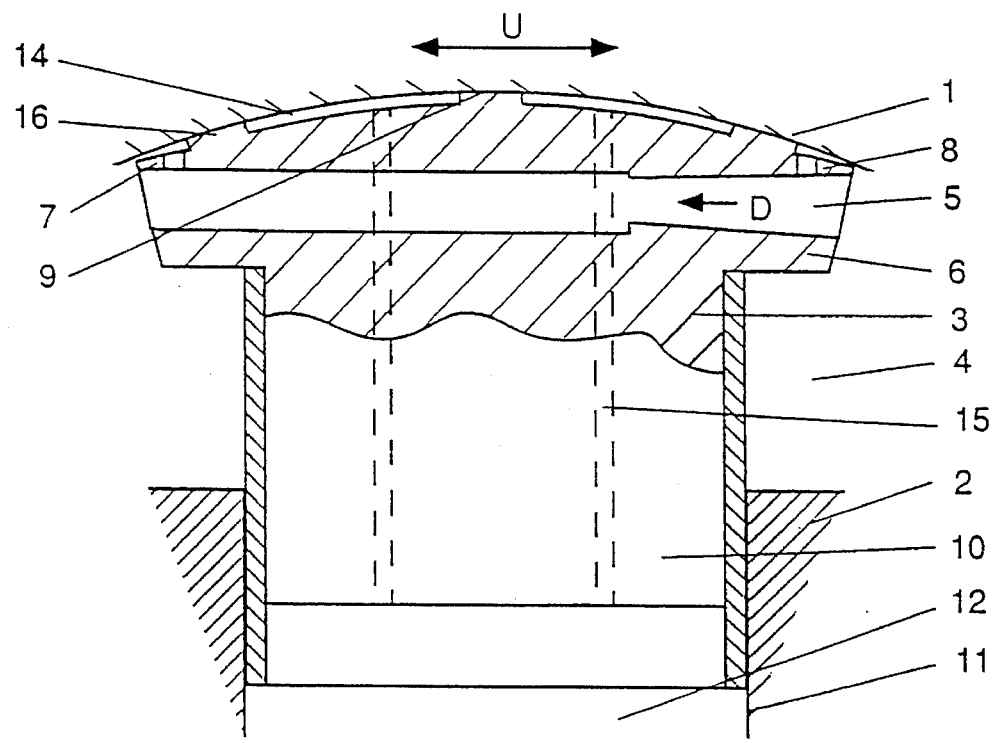
FIG. 2 is a section A—A in accordance with FIG. 1.

In the first three embodiments illustrated in FIGS. 1 to 5 the passages 5 extend in the circumferential direction U of the roll. In the first embodiment, the head 6 of the active element is extended beyond the boundary 16 of the bearing pockets 14 in the circumferential direction U so that the passage opening lies at least substantially at the inner side of the roll jacket 1. In order to prevent a pressure built up between the roll jacket 1 and this extension part 7 the extension part 7 has a plurality of openings 8 to the interior of the roll. Furthermore, as seen in FIG. 2, the cross section of the passage 5 increases in step-like manner in the direction of rotation D of the roll. This design can be used in rolls having a fixed direction of rotation D and leads to a reduction of the friction of the liquid at the walls of the passage and also of the flow resistance.

Figure 3:
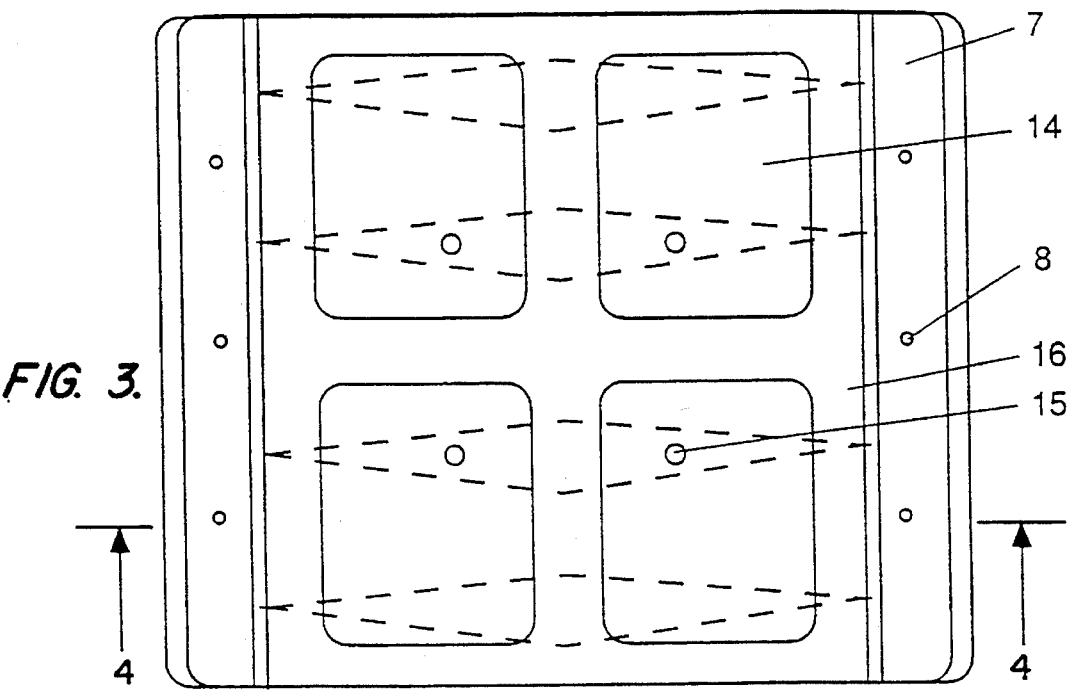
FIG. 3 is a plan view onto the radially outwardly directed surface 9 of an active element 3 of the second embodiment.
Figure 4:
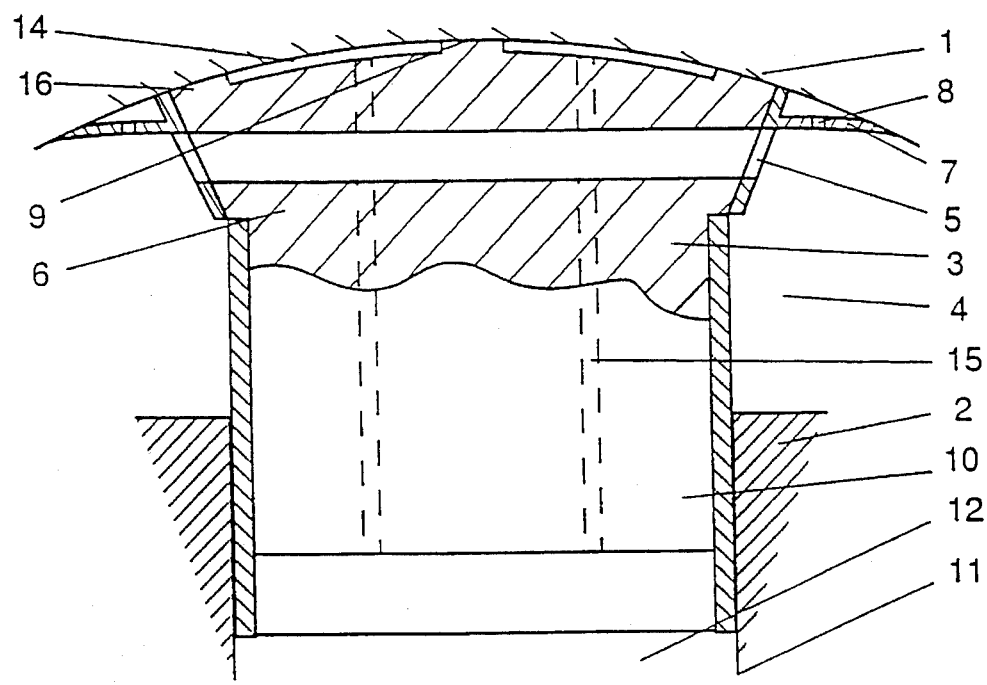
FIG. 4 is a section B—B in accordance with FIG. 3.

FIGS. 3 and 4 show the second embodiment with only the passage boundary directed to the roll jacket 1 being extended by a flexible extension piece 7. The flexible extension piece 7 is secured to the active element 3 beyond the respective passage opening. It either extends up to the inner side of the roll jacket and contacts it with guidance or terminates at a minimal spacing from the inner side of the roll jacket 1. In this case the extension piece 7 also has openings 8 to the interior of the roll.

Figure 5:
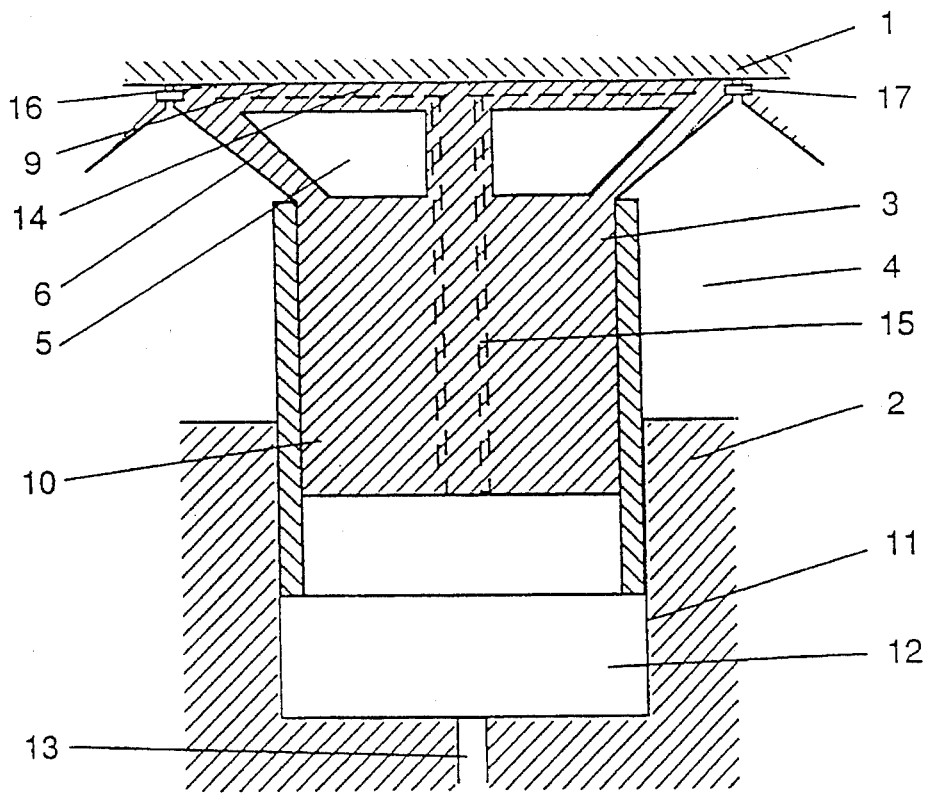
FIG. 5 is an axially extending section of an active element 3 of the third embodiment.

The third embodiment illustrated in FIG. 5 shows the possibility of enlarging the flow paths between the active elements 3. The axial width of the heads 6 of the working elements in the vicinity of the roll jacket 1 continuously reduces towards the carrier 2. Moreover, side surfaces of the working element heads 6 which extend in the circumferential direction U of the roll are led together so closely in the radially outermost region that they communicate via a seal 17. This reduces the flow away of oil over these side surfaces and thus contributes to reducing the pump power. A combination with other embodiments is in this case possible without any difficulties.

Figure 6:
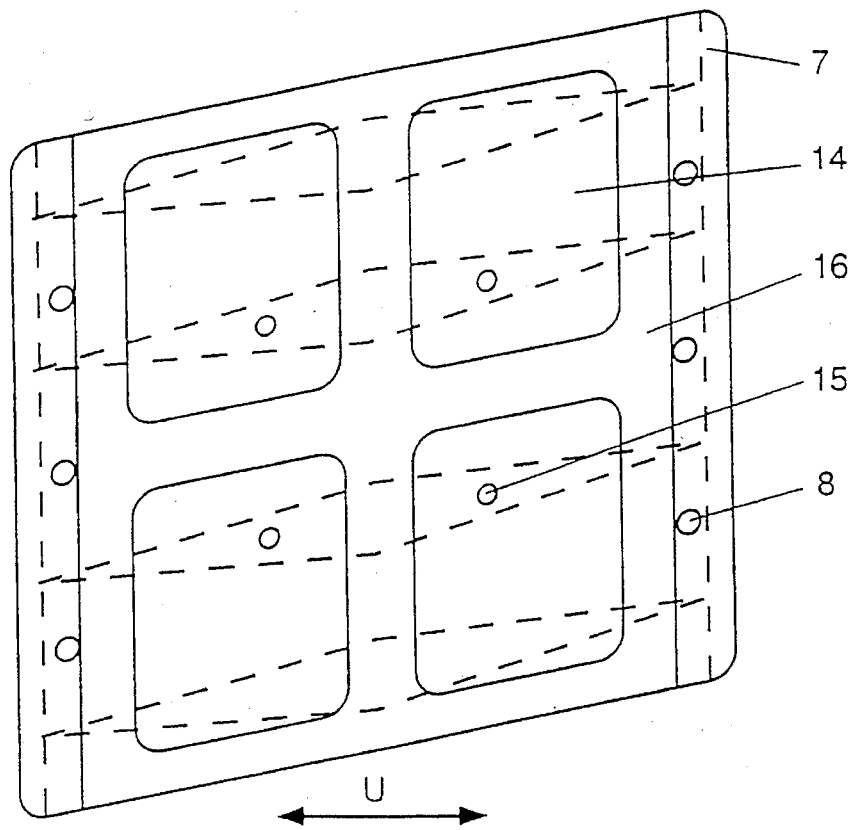
FIG. 6 is a plan view of the radially outwardly directed surface 9 of an active element 3 of the fourth embodiment.

The fourth embodiment shown in FIG. 6 is distinguished from the first embodiment of FIGS. 1 and 2 in that the radially outwardly directed surface 9 of the active element head 6 has the shape of a parallelogram; Two side surfaces of the parallelogram extend in the axial direction and with the other two surfaces extending obliquely to the circumferential direction U of the roll. This has advantages, in particular when using flexible roll jackets 1, since this leads to the contact pressure along the roll being made more uniform by the pressure sinks between the active elements 3. The technical design is shown with passages 5 extending at a maximum angle of 25° to the circumferential direction U of the roll. These passages aid the supply of the liquid to the means for leading the oil away which are mainly present at the ends of the roll. The same applies to the use of passages 5 which extend in a curved manner.

The invention is naturally not restricted to use with only hydrostatic support elements. Thus, by way of example, use with hydrodynamic support sources, and also with active elements which exert a positive or negative pressure on the roll jacket 1 with reference to the surrounding pressure within the roll is also possible. Furthermore, the roll jacket 1 can naturally also have the shape of a flexible press hose, or the like.

I claim:

1. In a roll including;

a roll jacket (1) rotatably journalled on a stationary carrier (2) for rotation in a circumferential direction (U) with a space between the roll jacket and the stationary carrier;

at least one stationary active element (3) being arranged between the roll jacket (1) and the stationary carrier (2);

a radially outwardly disposed active element head (6) contacting the roll jacket at a radially outwardly directed surface (9) on the at least one stationary active element (3); and, the space (4) between the stationary carrier (2) and the roll jacket (1) being at least partially filled with a liquid which is entrained by rotation of the roll jacket;

the improvement to the stationary active element comprising:

at least one passage (5) having respective passage openings and having a cross section sufficient for fluid flow extending in the circumferential direction (U) of the roll jacket passing through the radially outwardly disposed active element head (6) of the at least one stationary active element (3) to substantially enlarge a total cross section of the flow paths for the liquid to produce a low flow resistance for liquid entrained by the roll jacket.

2. In a roll according to claim 1 further including;

the at least one passage (5) lies at an angle of a maximum of 25° to the circumferential direction (U) of the roll.

3. In a roll according to claim 1 further including:

a preferably flexible extension piece (7) secured to the at least one stationary active element (3) beyond the respective passage openings adjacent the roll jacket (1).

4. In a roll according to claim 5 further including;

the extension piece (7) has apertures (8).

5. In a roll according to claim 1 further including;

of the active element head (6) has an axial width which reduces continuously towards the carrier (2).

6. In a roll according to claim 1 further including;

the roll jacket (1) rotatably journalled on a stationary carrier (2) for rotation in a circumferential direction (U) has a direction of rotation (D); and, the cross section sufficient for fluid flow of the passage (5) is enlarged in step-like manner in the direction of rotation (D).

7. In a roll according to claim 1 further including;

the radially outwardly directed surface (9) of the active element head (6) has a rectangular form.

8. In a roll according to claim 1 further including;

the radially outwardly directed surface (9) has a form of a parallelogram, with two side-surfaces extending in the axial direction and two sides extending obliquely to the circumferential direction (U) of the roll.

9. In a roll according to claim 1 further including;

the side-surfaces of the active element heads (6) extending approximately in the circumferential direction (U) of the roll at least almost contact one another in a radially outermost region and are preferably connected via a seal (17).

* * * * *